Filed March 28, 1969

INVENTOR.
DONALD C. JONES

INVENTOR.
DONALD C. JONES

United States Patent Office 3,632,696
Patented Jan. 4, 1972

3,632,696
METHOD FOR MAKING INTEGRAL
OPHTHALMIC LENS
Donald C. Jones, Southbridge, Mass., assignor to
American Optical Corporation, Southbridge, Mass.
Filed Mar. 28, 1969, Ser. No. 811,336
Int. Cl. B29d 11/00
U.S. Cl. 264—1  5 Claims

ABSTRACT OF THE DISCLOSURE

A method of making an integral ophthalmic lens includes prepositioning a pair of mold dies, having facing optical surfaces of plano base compound curves and arranged for positioning relative to one another, and placing a flexible gasket between the two dies forming a cavity, said gasket covering less than a total area of the dies, injecting liquified material into the cavity and treating said material to harden it to form thereby a lens. The lens so produced has any prescriptive power desired within a specific range and is relatively thin throughout its lateral extent.

---

A composite ophthalmic lens consisting of two similar lenses each having refractive surfaces of compound curvatures, laterally linearly adjusted relative to each other is described in U.S. Pat. No. 3,305,294, issued Feb. 21, 1967. The two similar lenses are positioned with their compound curvature faces together, and shifting one lens in relation to the other provides an ophthalmic lens of any spherical dioptric power, positive or negative, desired within a substantial range. The surfaces of the compound curvatures of the two lens elements, as described in said patent have been primarily considered and discussed in terms of varying thickness, $t$, throughout the lateral extent of the lens element. This thickness has been defined by a lens equation related to a system of rectangular coordinates of mutually perpendicular axes $x$, $y$ and $z$. The optical axis of each of the lens elements is considered as coincident with the $z$ axis of the system. Each lens element has a first surface which is flat or a surface of revolution and a second surface which is the surface of varying compound curvature defined by the following lens equation:

$$t = A(xy^2 + \tfrac{1}{3}x^3) + Dx + E$$

and wherein $t$ is the thickness at any point $x$, $y$; A is a constant which determines the rate at which the lens power varies with movement of one lens element relative to the other parallel to the $x$ axis; D is a coefficient of the equation that is linear in $x$ (for reducing the thickness of the lens element by a wedge-shaped volume, equal in effect to rotating the curved variable power surface of the lens element a small angular amount about its $y$ axis while the opposite surface of the element is held fixed); and E is a constant representing the thickness of the lens element at its center along its transverse or ($y$) center axis.

As described in the patent these two lens elements are disposed with their respective compound curvature surfaces in adjacent relation to each other. With such an arrangement, the lens has appreciable thickness in every position of adjustment wherein lens power is provided, but also, the two lens elements form an air lens between the two in order to function properly. These two lens elements cannot be cemented together after being placed in proper position, instead some sort of frame means is necessary for securing the lens elements together in selected position.

According to the present invention there is provided a lens which is a single, integral element having two exposed faces of related compound curvatures. There is, also provided a method for forming such lenses, as well as a die system for performing the process. In a simplified system, the dies for making the lens system preferably include identical mold elements, capable of being worked to an optical surface, and the mold elements are arranged to be juxtapositioned forming a space between the two and permitting a lens to be molded therebetween. Each such lens provides opposed, refractive optical curved surfaces on the lens, which provide the power desired in the lens at different points, thereby providing any spherical or toric prescriptive dioptric requirements in either a plus of minus range.

Included among the objects and advantages of the invention is to provide a single element, integral ophthalmic lens having on its two exposed outer surfaces refractive lens surfaces of controlled related compound curvatures prepositioned during manufacture to properly adjust the lens to a desired prescriptive requirement providing any desired prescription within a relatively wide range of spherical and cylindrical dioptric powers.

Another object of the invention is to provide a method for forming a single element ophthalmic lens having two opposed surfaces of refractive compound curvatures.

Another object of the invention is to provide a mold utilizing two opposed elements. Each element is capable of being positioned to provide an optical surface in relation to the other one. This allows one to provide predetermined power in a lens formed between the overlapping portions of the surfaces.

These and other objects and advantages of the invention may be apparent from the following description and the drawings in which.

Figure 1:
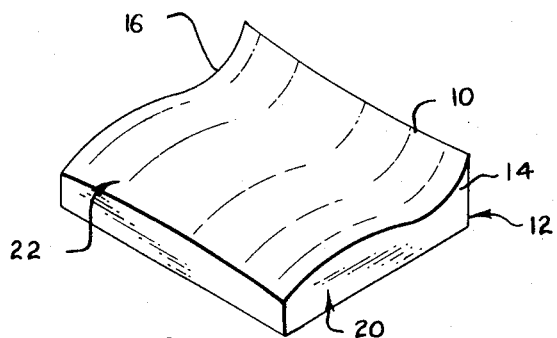
FIG. 1 is a perspective view of a die or mold element for making lenses according to the invention.
Figure 2:
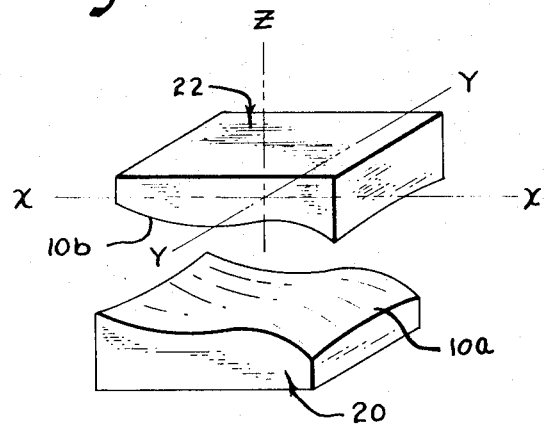
FIG. 2 is a perspective view of two mold elements positioned for making one particular type of lens.
Figure 3:
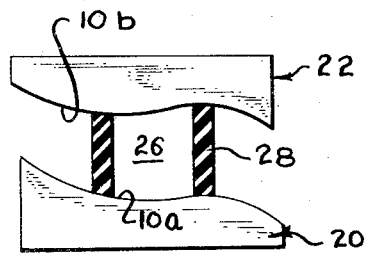
FIG. 3 is a side elevational view of the mold elements in juxtaposition for forming a lens according to the invention illustrating one form of barrier between the elements.

Identical mold elements, for molding plastic lenses may be readily formed, as illustrated in FIG. 1, by milling or grinding and polishing surface 10 of a block 12 with a compound curve, with the curvature extending across the block from edge 14 to edge 16. The block may be made of glass, stainless steel or other materials capable of being worked to an optical surface. The surface 10 has curves of the type, which form a lens surface substantially defined by the formula $$t = A(xy^2 + \tfrac{1}{3}x^3) + DxE$$

in which $t$ is a thickness at any point $x$–$y$; A is a constant which determines the rate at which the lens power varies with movement of one lens surface relative to the other; D is a coefficient of the equation that is linear in $x$, and E is a constant representing the thickness to the lens element at its center along the transverse center line ($y$). The surface 10 is milled or otherwise formed on the block. Two such blocks 20 and 22 are made. The blocks are then juxtapositioned as shown in FIG. 2 with one block turned 180° to the other, so that the surface 10a of the one block is spaced below the surface 10b of the other block. Under normal conditions, the block 20 is maintained stationary, and the block 22 is arranged for movement along the three axes $x$, $y$ and $z$. A provision may, also, be made for prism by tilting either of the blocks 20 or 22. A lens may be manufactured by filling, through opening 28a with a hypodermic needle or similar device, the cavity 26 between the blocks 20 and 22, which form the optical surfaces on the lens by means of the surfaces 10a and 10b, and flexible gasket 28 which seals between the surfaces on the blocks 20 and 22. The molds are positioned so that the cavity has the form of a composite lens with one surface corresponding to surface 10b on one side, and another surface corresponding to surface 10a on the other side. A catalyzed optical plastic monomer, such as is known in the art, is placed in the cavity and after filling the cavity the entire assembly may be placed in an oven or other heat exchange medium for a sufficient time and temperature cycle to polymerize the monomer. At the end of this cycle, the finished lens may be removed from the mold, edged and glazed in conventional manner.

Figure 4:
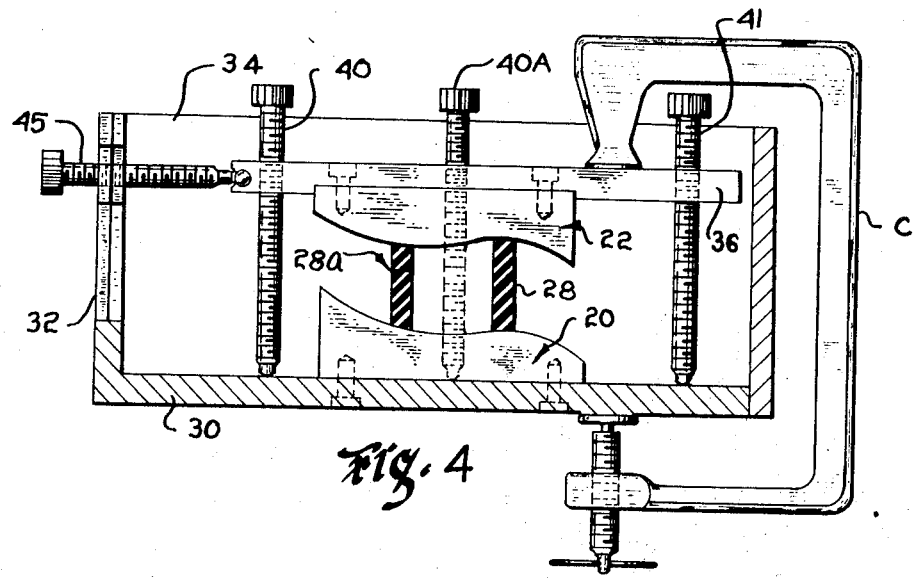
FIG. 4 is a side elevational view in partial section along the line A—A in FIG. 5 of one effective form of mold supporting apparatus.
Figure 5:
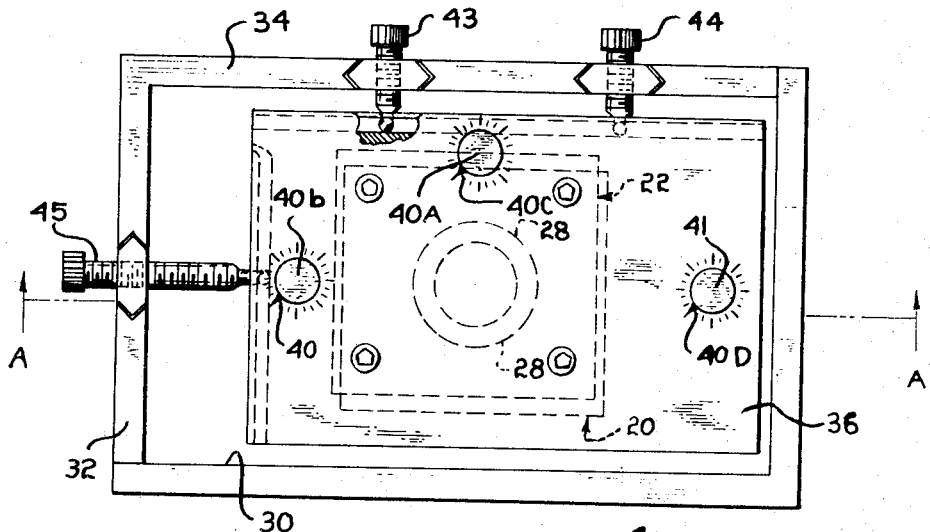
FIG. 5 is a top plan view of the device of FIG. 4.

A convenient holder for the mold elements is shown in FIGS. 4 and 5, wherein a base member 30 includes an upright end 32 and an upright back 34. A mold mount 36 supports upper mold 22, and the mold element 20 is secured to the base 30. Three thumb screws 40, 40a and 41 extend through the member 36 to the base and provide for movement of the block 22 along the z or vertical axis. Movement along the x–y axes is provided by axially threadable thumb screws 43 and 44 extending through vertically moveable slides 43a and 44a which ride in vertical slots in back upright 34 and thumb screw 45 and its similar slide 45a moveable in its slot through the end member 32, all at least in contact with member 36. In this manner, the mold blocks 20 and 22 may be placed in any desired position for arranging the surfaces in a prescribed position. In the simple schematic construction indicated in the drawings there must additionally be provided such as adjustable C-clamp C to hold the parts in predetermined position. Any other adjustable arrangement can be used instead of the C-clamps. For example, springs. A more elaborate approach is to fix element 20 to a table or the like and provide x, y and z slides in association with element 22.

In addition there must be some manner of dial including indicia to allow adjustment of the molds to produce various desired lens. In my simple schematic arrangement I show a pointer 40b, 40c, 40d and an associated dial for this purpose.

An alternative method of manufacture may be accomplished by using the same tooling (molds and holder) as a precision compression optical molding apparatus. In this case, a piece, roughly pre-formed, of thermoplastic, optical plastic, such as methyl methacrylate, of a volume slightly greater than that of the desired lens is placed between the mold elements 20 and 22, and the assembly is placed in an oven for an appropriate time-temperature cycle. During the cycle time the molds may be forced together under a constant force, and the thumb screws, for example, may be used as thickness stops. Surplus plastic material is expelled or squeezed out between the mold elements and at the end of the cycle the unit is removed from the heat source, and the recovered molded lens is then edged and glazed in a conventional manner.

Figures 6, 7:
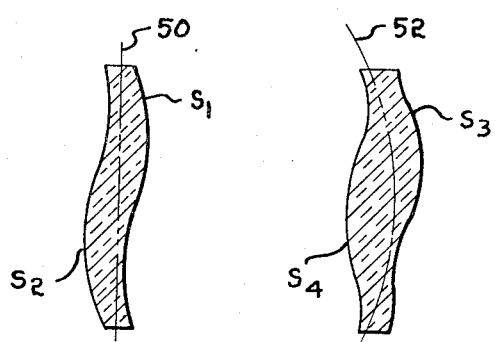
FIG. 6 is a side elevational view, in cross-section, of a lens formed by a process of the invention.
FIG. 7 is a modified form of a lens, in cross-section.

A finished uncut one cut piece lens will consist of a lens bounded by two optical surfaces, illustrated in FIG. 6, $S_1$ and $S_2$. For purposes of illustration, the lens will be considered in two parts, and the thickness of each lens part is determined by reference to a plane 50 within the lens (which reference surface may be either a plane or a suitable base sphere) and the thickness at any point on either surface is described by following two formulae $$t_1 = A_1(xy^2 + \tfrac{1}{3}x^3) + D_1x + E_1$$
$$t_2 = A_2(xy^2 + \tfrac{1}{3}x^3) + D_2x + E_2$$

wherein the respective variables and coefficients are similar to those defined hereinabove. $A_1$ may equal $A_2$ for a plane form, and $A_1$ is in some cases not equal to $A_2$ (as with a base sphere) for a meniscus form. These equations describe the surfaces when adjusted for zero power. The power in the overlapping portions of the two surfaces may be adjusted by displacing one surface in respect to the other along the $x$ axis for sphere power, and along the $y$ axis for cylinder power, and by tilting the surface one obtains prism power.

In my copending application Ser. No. 794,869, filed Jan. 29, 1969, entitled Two Element Ophthalmic Lens, there is described a two element lens formed by cementing two lens elements together, with the curved surfaces on the outside, which is an improvement of the lens of the above-mentioned patent. The one piece lens of the present invention has certain advantages over a composite cemented lens, since each element of the cemented lens must have a minimum thickness in order to permit fabrication, handling and cementing. In an integral lens according to the present invention the minimum thickness needs to occur only once rather than twice as in the cemented lens. In some cases, this minimum thickness of the two lens system may be quite high and thus the thickness savings with an integral lens may be considerable.

As already stated above, it is possible to displace one of the mold elements in relation to the other and thereby obtain a positive or negative sphere, cylindrical or toric power desired within predetermined limits. Such powers, of course, may be measured on a conventional lensometer or similar instrument.

After the lens elements have been removed from the mold edged as required, the lens may be then fitted in an ophthalmic frame by known techniques. These new lens elements and assembly technique will permit supplying all single vision requirements rapidly by use of the two mold elements. A lens, such as shown in FIG. 6, may, also, be made with the inner surface 50 on a spherical curve rather than flat or planar; as illustrated in FIG. 7, so that the radii of curvature of the concave and convex surfaces of the two surfaces of the lens may be within the general range used for "bending" conventional corrected ophthalmic lens. Thus, refractive surfaces $S_3$ and $S_4$, are referenced from a spherical plane $S_2$ forming the arcuate lens. For example, this bending may be a value within a range of from 2.0 to 6.5 diopters. Such ophthalmic lenses having the spherically curved interfaces provide better optical performance. As explained in the copending application when lens made according to the present invention are used, similar calculations will be made for adjusting the thickness of the lens to correspond with the exact line of sight with the average distance objects to be viewed through the lens. Thus, the thickness may be maintained in relation to the line of sight of an eye as it rotates about its center of rotation. This may be approximated by stretching or enlarging somewhat the coordinate system which defines the variable power surface of either surface of the lens.

In the figures of the drawing, the sizes, shapes and curvatures and amounts of adjustments have been exaggerated and are given for illustrative purposes only.

What is claimed is:

1. A method of manufacturing an integral ophthalmic lens of composite surface configuration, comprising the following steps which are performed in the order shown: forming two similar mold elements of a material capable of making an optical surface, the optical surface of each mold element having a predetermined compound curvature arranged to form a lens having an optical thickness, $t$, relative to a common internal base surface in a formed lens which is substantially defined by the formulae $$t_1 = A_1(xy^2 + \tfrac{1}{3}x^3) + D_1x + E_1$$
$$t_2 = A_2(xy^2 + \tfrac{1}{3}x^3) + D_2x + E_2$$

wherein $x$ and $y$ represent coordinates in mutually perpendicular relation to each other and approximately at right angles to the optical axis of the formed lens, the optical axis being generally coextensive with a $z$ coordinate which in turn is mutually perpendicular to said $x$ and $y$ coordinates, $A_1$ is a constant for determining rate of change of lens power with a first surface displacement in the $x$ direction, $A_2$ is a constant for determining rate of change of lens power with a second surface displacement in the $x$ direction, $D_1$ and $D_2$ are constants determining wedge-shaped prism volume by a term which is linear in $x$ for each portion, and $E_1$ and $E_2$ are constants representing the thicknesses of each element relative to said base surface at the optical axis thereof; prepositioning said mold elements with one rotated 180° to the other and one juxtaposed above the other, with their optical surfaces facing each other; adjusting the relative displacement between the elements in the $x$, $y$, and $z$ directions to correspond to any desired spherical-cylindrical dioptric power for the integral ophthalmic lens; filling at least a portion of the space between said mold elements with an optical, moldable material; treating said mold elements and contained moldable material at a sufficient temperature and for a sufficient time to permit the moldable material to conform to the shape of both surfaces of said mold elements and harden; removing the resultant uncut lens; and edging the lens.

2. A method according to claim 1, wherein said mold elements are prepositioned a predetermined nominal distance apart, which distance is the desired nominal thickness of the desired integral ophthalmic lens.

3. A method according to claim 2 wherein a flexible gasket is placed between and in contact with both facing surfaces of said mold elements forming a cavity, and moldable material is inserted into said cavity between said mold elements.

4. A method according to claim 1 wherein a piece of thermoplastic optical plastic is placed between said two mold elements, and on heating said mold elements compression mold said plastic to conform to said predetermined compound curvature surfaces.

5. A method according to claim 4 wherein stops are provided between said mold elements to predetermine the thickness of a piece of plastic compressed therebetween.

References Cited

UNITED STATES PATENTS

| | | | |
|---|---|---|---|
| 2,443,390 | 6/1948 | Kingston | 264—1 |
| 2,473,588 | 6/1949 | Johnson | 264—1 |
| 2,479,935 | 8/1949 | Johnson | 264—1 |
| 2,635,289 | 4/1953 | Owens | 264—1 X |
| 3,273,204 | 9/1966 | Craddock | 264—1 UX |
| 3,305,294 | 2/1967 | Alvarez | 351—169 |
| 3,460,928 | 8/1969 | Casko | 264—1 X |

ROBERT F. WHITE, Primary Examiner

A. M. SOKAL, Assistant Examiner

U.S. Cl. X.R.

264—219; 350—178, 189; 351—159, 177